(12) United States Patent
Wu et al.

(10) Patent No.: US 6,188,805 B1
(45) Date of Patent: *Feb. 13, 2001

(54) METHOD FOR ALIGNING CHARGE COUPLED DEVICE OF A SCANNER

(75) Inventors: Bing-Hsiu Wu, Taoyuan; Chien-Hsing Tang, Kweishan; Ted Cheng, Taoyuan, all of (TW)

(73) Assignee: Acer Communications and Multimedia Inc., Kweishan (TW)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/687,015

(22) Filed: Jul. 16, 1996

(51) Int. Cl.$^7$ .................................. G06K 7/00
(52) U.S. Cl. .................. 382/312; 382/313; 382/321
(58) Field of Search ................... 382/312, 313, 382/321; 358/406; 356/375; 437/50; 250/208.3

(56) References Cited

U.S. PATENT DOCUMENTS 3,927,468 * 12/1975 Anthony et al. .................. 437/50
4,724,330 * 2/1988 Tuhro ............................ 356/375
5,168,373 * 12/1992 Nakamura ....................... 358/406

FOREIGN PATENT DOCUMENTS 4-264881  9/1992 (JP) .................. H04N/1/387

* cited by examiner

Primary Examiner—Jose L. Couso
Assistant Examiner—Anh Hong Do
(74) Attorney, Agent, or Firm—Winston Hsu

(57) ABSTRACT

A method for automatically aligning a charge coupled device of a scanner by using a software contained in the scanner instead of physically aligning the charge coupled device is disclosed. The scanner comprises a charge coupled device (CCD) having an array of optic sensors for converting a reflected line image into an analog signal array, an analog-to-digital (A/D) converter for converting the analog signal array into an image data array, and a test region having a positioning mark in it. The method comprises the following steps of:
(1) generating an image data array which comprises the image of the test region in it by using the CCD and the A/D converter;
(2) identifying the positioning mark from the image data array; and
(3) setting an effective scanning range which defines the start and stop positions of valid image data within the image data array according to the identified positioning mark.

5 Claims, 3 Drawing Sheets

METHOD FOR ALIGNING CHARGE COUPLED DEVICE OF A SCANNER

BACKGROUND OF THE INVENTION

1. Field of the Invention

This invention relates to a scanner, and more particularly, to a method for aligning a charge coupled device (CCD) of a scanner.

2. Description of the Prior Art

Scanners are commonly used in office environment for scanning document images into computers. A scanner usually comprises a transparent window for allowing light reflected from a document to be scanned back to the scanner, a charge coupled device (CCD) having a plurality of optic sensors for converting a line image reflected from the document into an array of analog signals, a set of lenses for conveying light reflected from the document to the CCD, an analog-to-digital (A/D) converter for converting the analog signal array into an image data array, a control unit for controlling operations of the scanner, and a memory for storing the image data array. If the scanner is a flat bed scanner, the CCD and the lens set are packed inside a housing which is called a scanning module and the whole module is movably mounted on a guiding shaft. A step motor is used to move the scanning module forward and backward along the shaft for scanning a complete document placed above the transparent window of the scanner.

The CCD usually contains more light sensors than what are really needed for scanning a document. For example, it may contain 2750 light sensors which can generate 2750 analog signals or 2750 image data after A/D conversion when converting a line image, but within the 2750 image data only 2550 of them are taken by the scanner as valid image data and the rest of them are usually ignored. The selected 2550 image data within the overall 2750 image data are defined as effective scanning range of the CCD.

The effective scanning range is usually pre-programmed into a scanner by prior art methods. When assembling a new scanner, the physical location of each CCD within the scanner is precisely aligned in the assembly process in order to make sure that the effective scanning range of the CCD can match up with a target area within the transparent window for scanning a document placed on the window. One problem faced by the prior art methods is that even with such a precision alignment step, a scanner may still fail to pass a final effective scanning range test after the scanner is completely assembled.

The reason is that throughout the assembly process mechanical tolerances of various mechanical parts are continually accumulated between the relative position of the CCD and the target area of the transparent window. For example, when assembling a flat bed scanner, after the CCD within a scanning module is precisely aligned, the relative position between the scanning module and the shaft, the location of the transparent window within the scanner housing, the location of the shaft within the scanner housing, the connection part between the upper and lower scanner housing, etc., will all introduce some mechanical variations which may cause a line image reflected a document placed within the target area of the transparent window failed to be completely received by the CCD within the effective scanning range. In this case the scanner must be thoroughly checked and aligned again in order to make sure it can pass the effective scanning range test. In general, the precision alignment process of the CCD is a very time consuming process, and the rework of the scanner for passing the effective scanning range test also consumes a lot of time and effort.

SUMMARY OF THE INVENTION

It is therefore the goal of the present invention, by overcoming the limits of the prior art, to devise a new CCD alignment method to solve the above mentioned problem.

Briefly, in a preferred embodiment, the present invention includes a method for aligning a scanner, said scanner comprising a charge coupled device (CCD) having an array of optic sensors for converting a reflected line image into an analog signal array, an analog-to-digital (A/D) converter for converting the analog signal array into an image data array, and a test region having a positioning mark in it, the method comprising the following steps of:

(1) generating an image data array which comprises the image of the test region in it by using the CCD and the A/D converter;

(2) identifying the positioning mark from the image data array; and (3) setting an effective scanning range which defines the start and stop positions of valid image data within the image data array according to the identified positioning mark.

The scanner further comprises a memory for storing the image data array, and a control unit for controlling operations of the scanner and identifying the positioning mark from the image data array wherein the control unit generates the effective scanning range after identifying the positioning mark from the image data array and stores the effective scanning range in the memory.

It is an advantage of the present invention that since the effective scanning range of the CCD is identified by the control unit after the scanner is assembled, the tuning process of the CCD can easily be done. An assembly worker can roughly align the CCD to make sure that the target area of the transparent window is located over the center part of the CCD as long as the positioning mark is covered. The scanner itself will automatically set the effective scanning range of the CCD.

These and other objects and the advantages of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
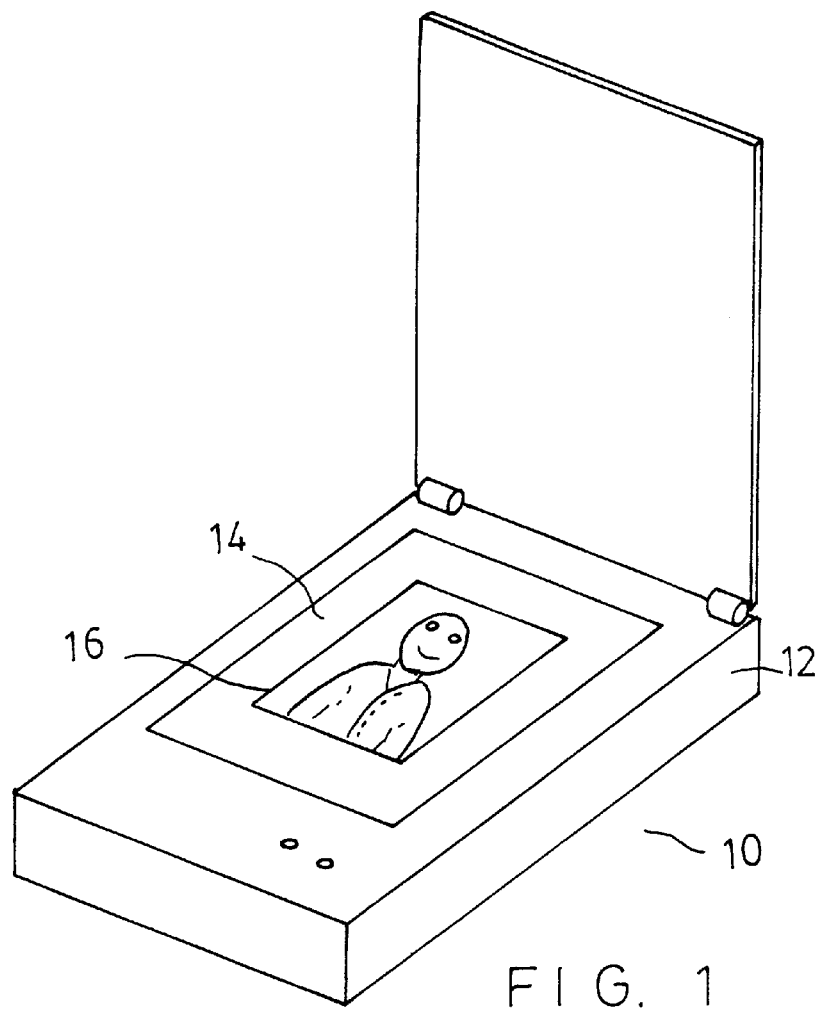
FIG. 1 is a perspective view of an optic scanner according to the present invention.
Figure 2:
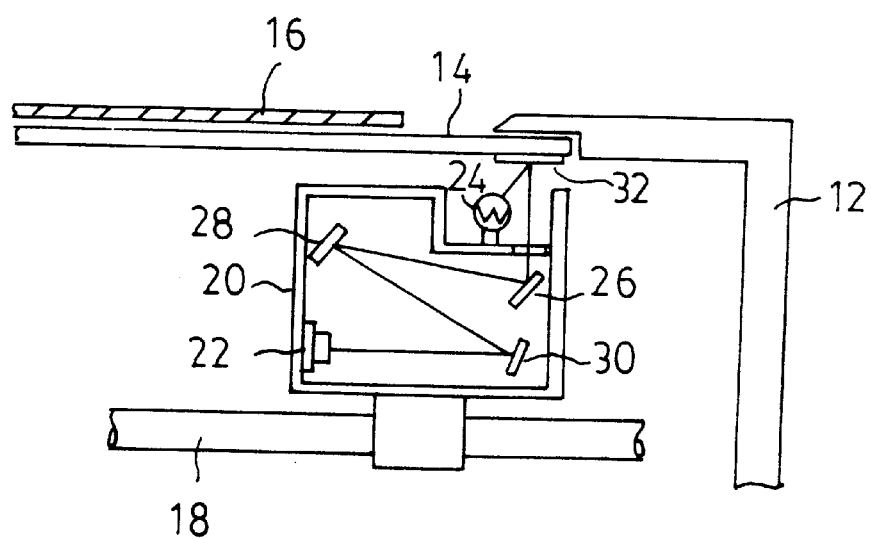
FIG. 2 is a sectional view of a corner portion of the optic scanner shown in FIG. 1.

FIG. 1 is a perspective view of an optic scanner 10 according to the present invention. The scanner 10 comprises a housing 12, a transparent window 14 and a document 16 to be scanned placed on the window 14. FIG. 2 is a sectional view of a corner portion of the scanner 10 shown in FIG. 1. It shows that the scanner 10 comprises a guiding shaft 18, a scanning module 20 movably mounted on the shaft 18 with a charge coupled device (CCD) 22 installed in it for scanning the document 16, and a test region 32 installed under one end of the transparent window 14 for calibrating the CCD 22. The scanning module 20 comprises a light source 24 for illuminating the document 16 and a lens set which comprises three reflective mirrors 26, 28 and 30 for conveying light to the CCD 22.

Figure 3:
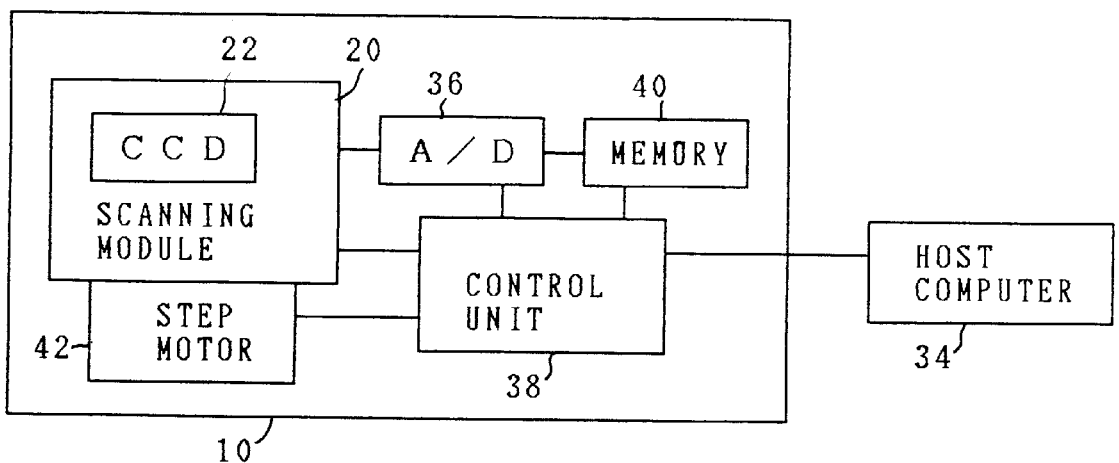
FIG. 3 is a function block diagram of the optic scanner shown in FIG. 1 which is connected to a host computer.

FIG. 3 is a function block diagram of the optic scanner 10 shown in FIG. 1 which is connected to a host computer 34. The scanner 10 comprises a scanning module 20, a CCD 22 installed in the scanning module 20 which comprises an array of optic sensors (not shown) for converting a reflected line image into an analog signal array, an analog-to-digital (A/D) converter 36 for converting the analog signal array into an image data array, a memory 40 for storing the image data array, a control unit 38 for controlling operations of the scanner 10, and a step motor 42 for moving the scanning module 20 along the shaft 18 shown in FIG. 2.

Figure 4:
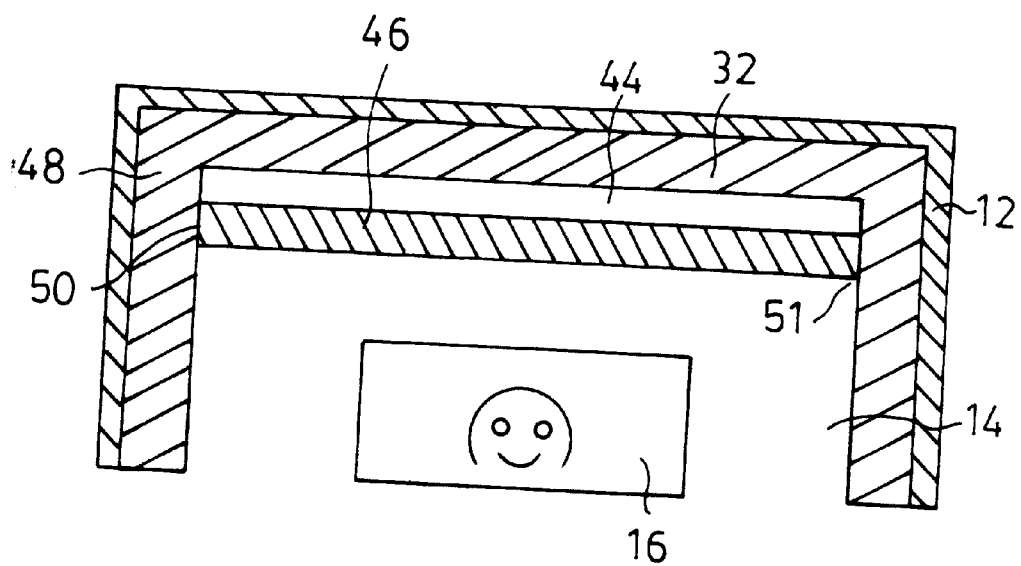
FIG. 4 is a bottom view of portion of the transparent window and the scanner housing for illustrating the test region of the scanner shown in FIG. 2.

FIG. 4 is a bottom view of portion of the transparent window 14 and the scanner housing 12 for illustrating the test region 32 of the scanner 12 shown in FIG. 2. The test region 32 is installed under one end of the transparent window 14 which comprises a white strip 44 and a black strip 46 for calibrating image data arrays generated from the optic sensors of the CCD 22. The scanner housing 12 is made by plastics and the surrounding area 48 of the housing 12 is usually presented in light grey color. The boundary 50 between the black strip 46 and the surrounding area 48 is used as a positioning mark for aligning the effective scanning range of the CCD 22. The target area of the transparent window 14 which is to be scanned by the CCD 22 is located between the boundaries 50 and 51.

Figure 5:
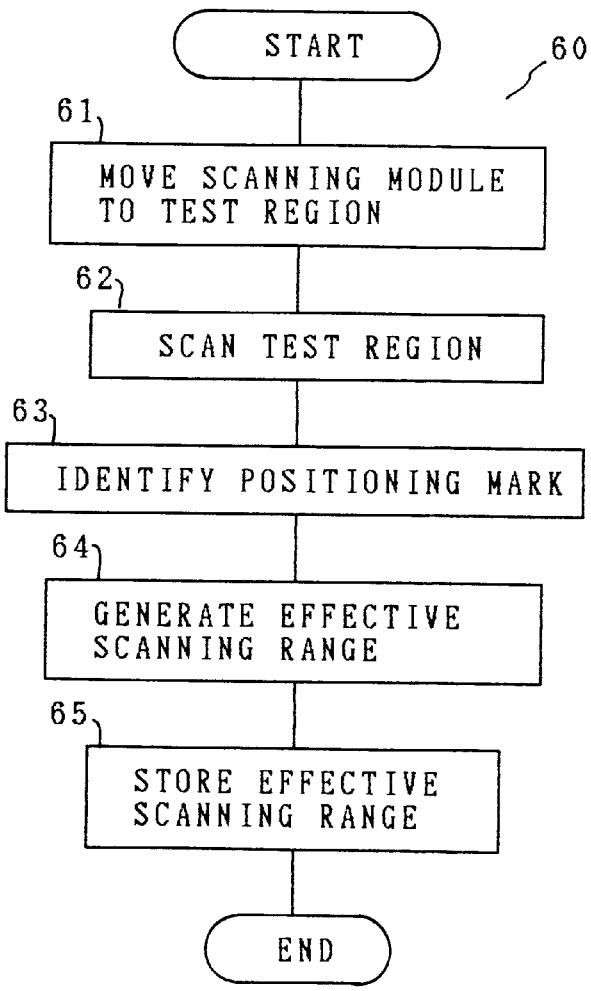
FIG. 5 is a process for aligning the effective scanning range of the CCD.

FIG. 5 presents a process 60 executed by the control unit 38 for aligning the effective scanning range of the CCD 22. The process 60 comprises the following steps:

step 61 moving the scanning module 20 to a position under the black strip 46 of the test region 32 by using the step motor 42;

step 62 scanning the test region 32 and generating an image data array which comprises the image of the test region 32 in it by using the CCD 22 and the A/D converter 36;

step 63 identifying the positioning mark 50 from the image data array;

step 64 generating an effective scanning range which defines start and stop positions of valid image data within the image data array according to the identified positioning mark within the image data array;

step 65 storing the effective scanning range in the memory 40.

The process 60 can be executed when powering on the scanner 10 to set the effective scanning range of the CCD 22, or it can be executed each time before scanning a new document. There are many ways to determine the effective scanning range of a CCD by using various positioning marks. In FIG. 4, since the width of the target area from points 50 to 51 of the transparent window 14 is fixed, once the location of the positioning mark 50 within the image data array is identified, the effective scanning range of the CCD 22 can also be determined. The positioning marks can also be placed on both ends (points 50 and 51) of the black strip 46 for identifying the effective scanning range. In this way the control unit 38 must identify both positioning marks in step 63 so that the start and stop positions of the effective scanning range can be obtained.

Figure 6:
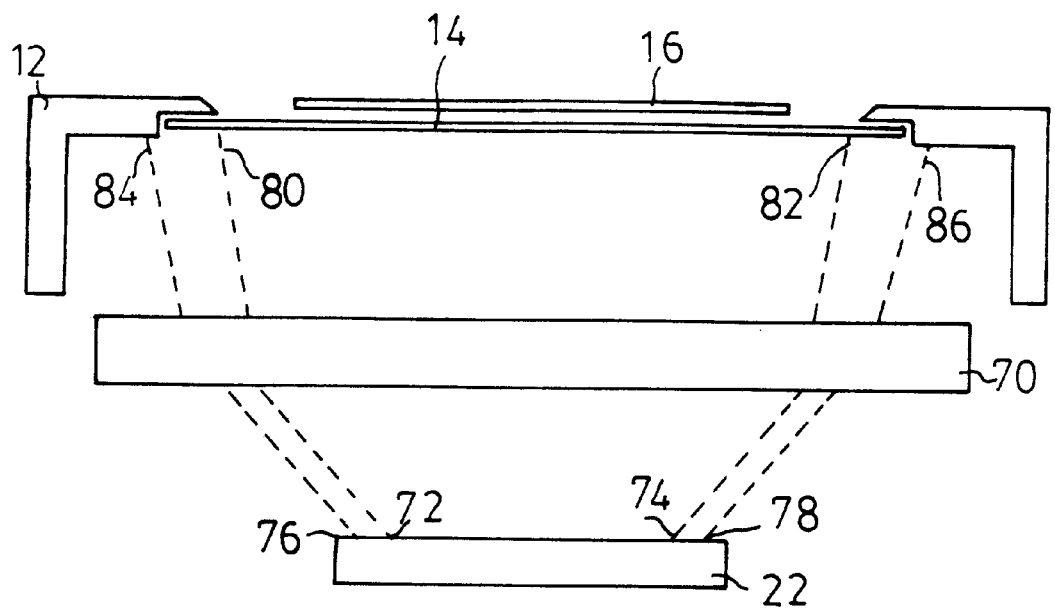
FIG. 6 is a diagrammatic view which shows both the scanned area and target area of the CCD.

FIG. 6 is a diagrammatic view which shows both the scanned area and target area of the CCD 22 shown in FIG. 3. The CCD 22 comprises an array of optic sensors (not shown) positioned between points 76 and 78 for converting a line image reflected from the scanned area between points 84 and 86 into an analog signal array. And the optic sensors located between points 72 and 74 are set as the effective scanning range by the control unit 38 for scanning the target area between points 80 to 82 of the transparent window 14 after the process 60 is executed. The lens set which comprises three reflect mirrors 26, 28 and 30 shown in FIG. 2 is represented as a block 70 for conveying light between the transparent window 14 and the CCD 22.

It can easily be seen that the scanned area (between points 84 and 86) is wider than the target area (between points 80 and 82). By using the process 60 presented in this invention, the tuning process of the CCD 22 can easily be done because an assembly worker needs only to make sure that the target area is approximately located in the center of the scanned area as long as the positioning mark is covered. Mechanical variations added to the physical location of the CCD 22 will not cause any problem as long as the target area is still located within the scanned area of the CCD 22 after the scanner 10 is assembled. The process 60 will automatically identify the target area and set the effective scanning range of the CCD 22 accordingly.

In contrast, the traditional methods mentioned above fix the effective scanning range of the CCD 22 first and then have an assembly worker to fine tune the CCD 22 to make sure that the target area is closely matched up with the effective scanning range of the CCD 22. By using this method it can easily be seen that mechanical variations added to the CCD 22 can easily cause mismatch between the effective scanning range (between points 72 and 74) and the target area (between points 80 and 82), and rework of the scanner 10 is required if such a mismatch happens.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for setting an effective scanning range of a scanner, said scanner comprising a housing having a transparent window for placing a document to be scanned, a test region installed in the housing having a positioning mark in it, a scanning module movably mounted in the housing for scanning the document, the scanning module comprising a charge coupled device (CCD) having an array of optic sensors for converting a line image into an analog signal array, and an analog-to-digital (A/D) converter for converting the analog signal array into an image data array, the method comprising the following steps of:

(1) moving the scanning module to the test region;

(2) generating an image data array which comprises the image of the test region in it by using the CCD and the A/D converter;

(3) identifying the positioning mark from the image data array; and (4) setting an effective scanning range along the array of optic sensors which defines the start and stop positions of valid image data within the image data array according to the identified positioning mark.

2. The method of claim 1 wherein the scanner further comprises a memory for storing the image data array.

3. The method of claim 2 wherein the scanner further comprises a control unit for controlling operations of the scanner and identifying the positioning mark from the image data array wherein the control unit generates the effective scanning range after identifying the positioning mark from the image data array and stores the effective scanning range in the memory.

4. The method of claim 1 wherein the effective scanning range is set when the scanner is powered on.

5. The method of claim 1 wherein the effective scanning range is set when a document is to be scanned.

* * * * *